US007643181B2

(12) United States Patent
Haas et al.

(10) Patent No.: US 7,643,181 B2
(45) Date of Patent: Jan. 5, 2010

(54) METHOD AND SYSTEM FOR PRINTING AN ORIGINAL IMAGE AND FOR DETERMINING IF A PRINTED IMAGE IS AN ORIGINAL OR HAS BEEN ALTERED

(75) Inventors: Bertrand Haas, New Haven, CT (US); Andrei Obrea, Seymour, CT (US)

(73) Assignee: Pitney Bowes Inc., Stamford, CT (US)

( * ) Notice: Subject to any disclaimer, the term of this patent is extended or adjusted under 35 U.S.C. 154(b) by 955 days.

(21) Appl. No.: 11/011,829

(22) Filed: Dec. 14, 2004

(65) Prior Publication Data

US 2006/0126094 A1 Jun. 15, 2006

(51) Int. Cl.
*G06K 9/00* (2006.01)

(52) U.S. Cl. ...................................... 358/3.28; 382/100

(58) Field of Classification Search ................ 358/3.28; 382/100

See application file for complete search history.

(56) References Cited

U.S. PATENT DOCUMENTS

| | | | | |
|---|---|---|---|---|
| 4,910,460 | A | 3/1990 | Sebok | |
| 5,825,892 | A | 10/1998 | Braudaway et al. | |
| 6,185,312 | B1 | 2/2001 | Nakamura et al. | 382/100 |
| 6,317,115 | B1 | 11/2001 | Yokomizo | |
| 6,332,030 | B1 | 12/2001 | Manjunath et al. | 382/100 |
| 6,332,194 | B1 | 12/2001 | Bloom et al. | |
| 6,385,329 | B1 | 5/2002 | Sharma et al. | 382/100 |
| 6,711,276 | B1 | 3/2004 | Yoshiura et al. | 382/100 |
| 6,728,408 | B1 | 4/2004 | Echizen et al. | 382/232 |
| 6,804,379 | B2 | 10/2004 | Rhoads et al. | 382/101 |
| 6,823,455 | B1 | 11/2004 | Macy et al. | 713/176 |
| 6,993,151 | B2 | 1/2006 | Tsai et al. | 382/100 |
| 7,065,237 | B2 | 6/2006 | Murakami | 382/137 |
| 2001/0040979 | A1 | 11/2001 | Davidson et al. | 382/100 |
| 2002/0021824 | A1* | 2/2002 | Reed et al. | 382/100 |
| 2002/0126870 | A1 | 9/2002 | Wendt | 382/100 |
| 2002/0157005 | A1 | 10/2002 | Brunk et al. | |
| 2002/0176114 | A1 | 11/2002 | Zeller et al. | |
| 2003/0026453 | A1 | 2/2003 | Sharma et al. | 382/100 |
| 2003/0053653 | A1 | 3/2003 | Rhoads | 382/100 |
| 2003/0159046 | A1 | 8/2003 | Choi et al. | |
| 2003/0215112 | A1 | 11/2003 | Rhoads et al. | 382/100 |

(Continued)

FOREIGN PATENT DOCUMENTS

WO 03/012727 A1 2/2003

*Primary Examiner*—Mark K Zimmerman
*Assistant Examiner*—Kent Yip
(74) *Attorney, Agent, or Firm*—Ronald Reichman; Angelo N. Chaclas

(57) ABSTRACT

A method for printing an original image which is protected against copying or alteration, such as a postal indicium, and for determining if that image has been altered. The image includes a copy detection feature and coded information linked to the copy detection feature. Altered images are detected by testing to determine if the link between the copy detection feature and the coded information in fact exists. The copy detection feature and the coded information can be linked by: 1) scanning the image to recover the coded information and the copy detection feature; 2) test the coded information and copy detection feature, and 3) accept the printed image as unaltered if the test indicates that the nominal link exists in fact.

4 Claims, 11 Drawing Sheets

U.S. PATENT DOCUMENTS

2004/0030899 A1 2/2004 Lee ............................ 713/176
2004/0049401 A1* 3/2004 Carr et al. ...................... 705/1
2004/0105569 A1 6/2004 Sharma et al. ............. 382/100
2004/0153649 A1 8/2004 Rhoads et al.
2004/0218782 A1* 11/2004 Brunk ........................ 382/100
2004/0236951 A1 11/2004 Zhao
2005/0025338 A1* 2/2005 Zhao et al. .................. 382/100
2005/0114668 A1 5/2005 Haas et al. .................. 713/176
2006/0002583 A1* 1/2006 Reed et al. .................. 382/100
2006/0045306 A1 3/2006 Cordery et al. ............. 382/100
2006/0109515 A1* 5/2006 Zhao et al. ................. 358/3.28

* cited by examiner

METHOD AND SYSTEM FOR PRINTING AN ORIGINAL IMAGE AND FOR DETERMINING IF A PRINTED IMAGE IS AN ORIGINAL OR HAS BEEN ALTERED

CROSS REFERENCE TO RELATED APPLICATIONS

Reference is made to commonly assigned copending patent application Ser. No. 10/720,664 entitled "Fragile Watermark for Detecting Printed Image Copies" in the names of Robert A. Cordery, Claude Zeller and Bertrand Haas; Ser. No. 10/720,292 entitled "Detecting Printed Image Copies Using Phase-Space-Encoded Fragile Watermark" in the names of Robert A. Cordery, Claude Zeller and Bertrand Haas; and Ser. No. 10/720,503 "Watermarking Method with Print-Scan Compensation" in the name of Bertrand Haas.

BACKGROUND OF THE INVENTION

The subject invention relates to the field of printed document or image (hereinafter "image") security, and, more particularly, to determination if a copy detection feature in a printed image is "linked" (i.e., associated in a predetermined manner as will be defined below) to coded information in that image to determine whether the printed image is an original or a copy or has been altered.

Advances in the arts of photocopying and digital image scanning and printing have made it increasingly easy to make copies of printed images with such high fidelity that it is difficult to distinguish between an original printed image and a photocopy or scanned-and-printed copy of the original image. These advances have implications in regard to such secure documents or images as postage meter indicia, paper currency, and event and travel tickets. Therefore, it is desirable to provide secure images with printed images that incorporate special features, sometimes referred to as "copy detection features", wherein copying of the printed image results in changes of the feature in the copy relative to the original image in a manner that can be detected with a degree of reliability and convenience.

FIG. 1 shows a simplified representation of one such image, postage meter indicium 10. Such indicia are printed on mailpieces by postage meters to verify that the appropriate postage has been paid. (Operation of such postage meters is well known and need not be discussed further for an understanding of the subject invention.) Indicium 10 typically includes textual information such as Post Office identification 12, date 14, serial number 16, and postage amount 20. Indicium 10 also includes graphic elements such as logo 22.

Heretofore such elements were printed with physical graphic security features such as special fluorescent inks or very specific resolution so that it was difficult to copy a postage meter indicium. However, more recently, computer based postage meters, which use commercially available digital printing mechanisms have been developed. These meters lack physical graphic security features. Concurrently, postal services such as the USPS have required that postage meter indicia include postal information in machine-readable and machine verifiable form. In indicium 10 this is provided by two-dimensional barcode 24 which carries the postage amount and other postal information, and which is digitally signed in a conventional manner. Typically barcode 24 is provided in accordance with Information Based Indicia (hereinafter "IBI") standards of the United States Postal Service.

Because barcode 24 typically is the only part of indicium 10 which is automatically checked when a mailpiece is input to a postal service, it effectively is the indicium and, where meters lack security features, may be easily copied; possibly allowing two attacks:

1) An attacker can make multiple copies of indicium 10 without payment.

2) An attacker can print a high denomination indicium, make multiple copies of barcode 24, print multiple low denomination indicia, and carefully cut and paste high denomination barcode copies into low denomination indicia.

Protection against the first attack can be provided by incorporation of a watermark, as described in the above mentioned copending patent application Ser. No. 10/720,664 "Fragile Watermark for Detecting Printed Image Copies" and Ser. No.: 10/720,292 "Detecting Printed Image Copies Using Phase-Space-Encoded Fragile Watermark", or by use of any other convenient copy detection feature, such as the commercially available Mediasec Copy Detection Pattern (hereinafter CDP SEAL). While the cutting and pasting of barcode copies might be easily detected at a forensic check point (e.g., visual inspection by a postal service worker); it is likely to pass undetected when first input to a postal service and never be subject to further inspection.

Thus it is an object of the subject invention to provide a method and system for printing an image such as a postage meter indicium, or similar image representing value, and for detecting when such an image has been altered.

SUMMARY OF THE INVENTION

The above object is achieved and the disadvantages of the prior art are overcome in accordance with the subject invention by a method and system for determining if a printed image is an unaltered image. The image includes coded information and a copy detection feature putatively linked to the coded information. The system is controlled in accordance with the method of the subject invention to a) scan the image to recover the coded information and the copy detection feature; b) test the coded information and the copy detection feature; and c) accept the printed image as unaltered if the test indicates that the nominal link exists in fact.

As used herein "coded information" means a machine-readable representation of information. Preferably, the representation is a two-dimensional barcode but can be any other convenient machine-readable representation. As used herein "copy detection feature" means a feature of an original image that has the property that copying of the original image results in changes to the feature in the copy, relative to the original image, that can be detected with a degree of reliability and convenience; thus providing protection against the first attack described in paragraph 0005 above. Features, or elements of features, having this property are termed "fragile". Preferably, the copy detection feature is a commercially available Mediasec CDP seal but can be any convenient feature. As used herein, "linked" means that a copy detection feature and coded information are related by one of the following:

1) generating the copy detection feature as a pseudorandom function of the coded information; identifying a type of printer corresponding to the printer; and incorporating information identifying the type of printer into the image; or 2) creating a robust descriptor of the copy detection feature; and incorporating the descriptor into the coded information; or 3) creating a robust descriptor of the copy detection feature; and incorporating the descriptor into the coded information, and modifying the copy detection feature as a pseudorandom function of the coded information; or 4) generating the copy detection feature as a pseudorandom function of the coded information; creating a robust descriptor of the copy detection feature; and incorporating the descriptor into the coded information.

As used herein "robust elements" of a copy detection feature are elements which are recovered substantially without change when the feature is printed and scanned, and "robust descriptor" means information generated as a function of such robust elements; so that a robust descriptor can be regenerated, at least approximately, from a recovered copy detection feature.)

In accordance with one aspect of the subject invention, a copy detection feature is putatively linked to the coded information as defined in subparagraph 1) above and the copy detection feature and coded information are tested by: a) scanning the image to recover the printer type information; b) regenerating the copy detection feature as a pseudorandom function of the coded information; c) applying a print-scan model corresponding to the printer type information to the regenerated copy detection feature to transform the regenerated feature; d) computing a distance between the recovered copy detection feature and the transformed copy detection feature; and e) indicating that the nominal link exists in fact if the distance is less than a predetermined threshold. Of course, the scanner used is known to the testing party.

In accordance with another aspect of the subject invention a copy detection feature is putatively linked to the coded information as defined in subparagraph 2) above and the copy detection feature and coded information are tested by a) recovering the robust descriptor from the coded information; b) regenerating the robust descriptor from the recovered copy detection feature; c) comparing the recovered and the regenerated robust descriptors; and e) indicating that the nominal link exists in fact if the descriptors are at least substantially similar.

Preferably, similarity between descriptors is determined by computing a distance between descriptors, preferably a Hamming type distance; as described below. Descriptors are considered to be substantially similar if the distance is less than a predetermined threshold.

In accordance with another aspect of the subject invention, a copy detection feature is putatively linked to the coded information as defined in subparagraph 3) above, and the copy detection feature and coded information are tested by a) regenerating the modifications as a pseudorandom function of the coded information; b) subtracting the regenerated modifications from the recovered coded information; then, c) regenerating the robust descriptor from the recovered copy detection feature; d) recovering the robust descriptor from the coded information; e) comparing the recovered and the regenerated robust descriptors; and f) indicating that the nominal link exists in fact if the descriptors are at least substantially similar. Preferably, the regenerated modifications are transformed by a print-scan model to more closely approximate the modifications after printing and scanning.

In accordance with another aspect of the subject invention, a copy detection feature is putatively linked to the coded information as defined in subparagraph 4) above, and the copy detection feature and coded information are tested by a) regenerating the robust descriptor from the recovered copy detection feature; b) recovering the robust descriptor from the coded information; c) comparing the recovered and the regenerated robust descriptors; and d) if the descriptors are at least substantially similar; then e) regenerating the copy detection feature as a pseudorandom function of the coded information; f) computing a distance between the recovered copy detection feature and the regenerated copy detection feature; and g) indicating that the nominal link exists in fact if the distance is less than a predetermined threshold.

In accordance with still another aspect of the subject invention, a determination is made if a printed image is an unaltered image, the image including coded information and a copy detection feature which nominally has been associated with the coded information by being generated as a pseudorandom function of the coded information, the image including information identifying a printer used to print the image, by controlling a system in accordance with the subject invention to a) scan the image to recover the printer identifying information, the coded information and the copy detection feature; b) regenerate the copy detection feature as a pseudorandom function of the coded information; c) compute a distance between the recovered copy detection feature and the regenerated copy detection feature; and d) indicate that the image is unaltered if the distance is less than a predetermined threshold; then e) add the distance to a copy likelihood index; and f) indicate a possible problem with the identified printer if the copy likelihood index is greater than a second predetermined threshold. Preferably, the regenerated copy detection feature is transformed by a print-scan model to more closely approximate the modifications after printing and scanning.

Other objects and advantages of the subject invention will be apparent to those skilled in the art from consideration of the detailed description set forth below and the attached drawings.

BRIEF DESCRIPTION OF THE DRAWINGS

The present invention is illustrated by way of example, and not by way of limitation, in the figures of the accompanying drawings and in which like reference numerals refer to similar elements or steps and in which.

DETAILED DESCRIPTION OF PREFERRED EMBODIMENTS OF THE INVENTION

Figure 1:
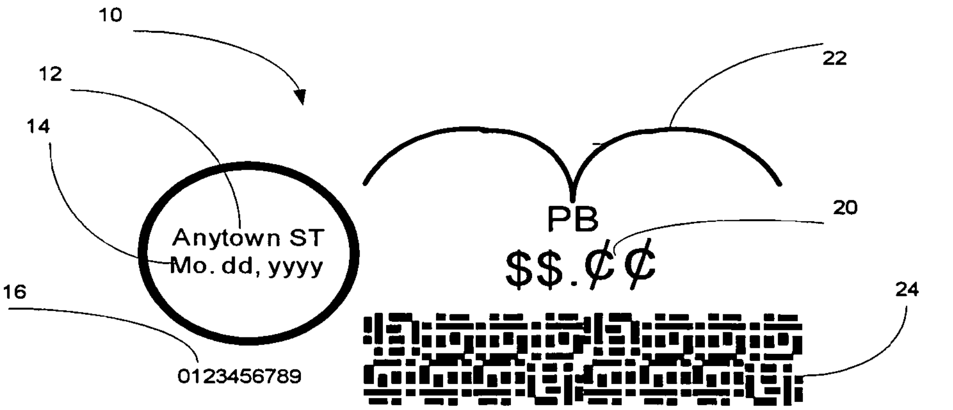
Fig. 1 (prior art)
FIG. 1 shows a representation of a prior art postage meter indicium.
Figure 2:
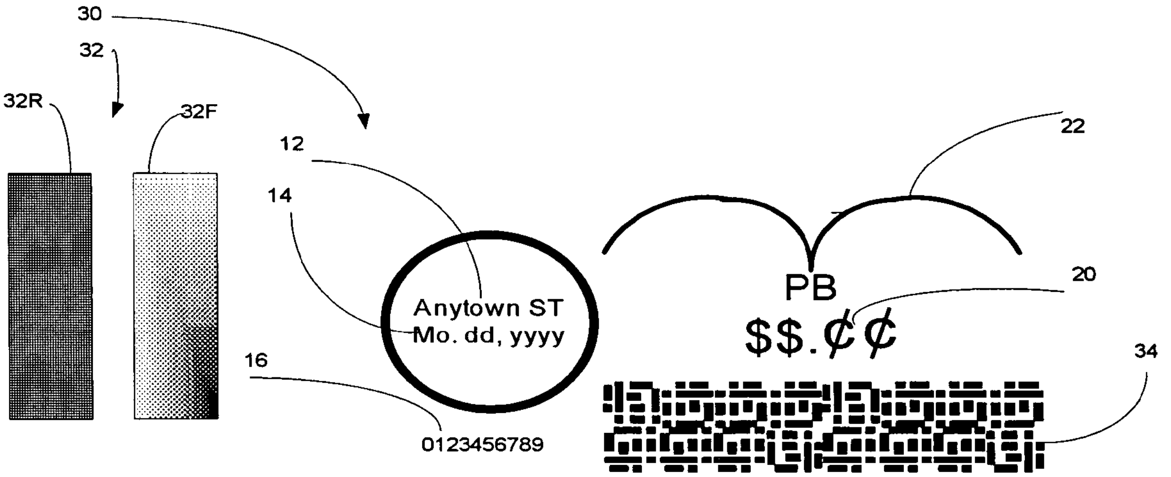
FIG. 2 shows a representation of a postage meter indicium in accordance with the subject invention.

FIG. 2 shows indicium 30 in accordance with the subject invention. Indicium 30 includes Post Office identification 12, date 14, serial number 16, and postage amount 20, and logo 22; essentially unchanged from similar elements shown in FIG. 1. Indicium 30 also includes copy detection feature 32 and barcode 34. Feature 32 includes fragile elements 32F and, in preferred embodiments described below, robust elements 32R, from which robust descriptors are generated. In these preferred embodiments the robust descriptors are incorporated into barcode 34, as will also be described further below. Robust elements 32R can be a simple linear barcode. Fragile elements 32F preferably comprise a commercially available Mediasec CDP seal but can be any convenient copy detection feature such as a watermark.

While robust elements 32R are shown as a contiguous structure, spaced from elements 32F for ease of description, it will be understood that any convenient form of robust elements can be used. For example, elements 32R can comprise fiducial marks (i.e., robust marks whose location conveys information) superimposed on elements 32F, or can comprise statistical parameters of elements 32F chosen to be substantially invariant with printing and scanning. Elements 32R can also be disjoint and its location, or locations, within indicium 30 can vary. By using these techniques, or some combination thereof, indicium 30 can be protected against variations of the second attack described in paragraph 0005 above, where both barcode 34 and elements 32R are copied and pasted into low denomination indicia. Development of robust elements 32R is well within the ability of those skilled in the art and need not be discussed further for an understanding of the invention.

Figure 3:
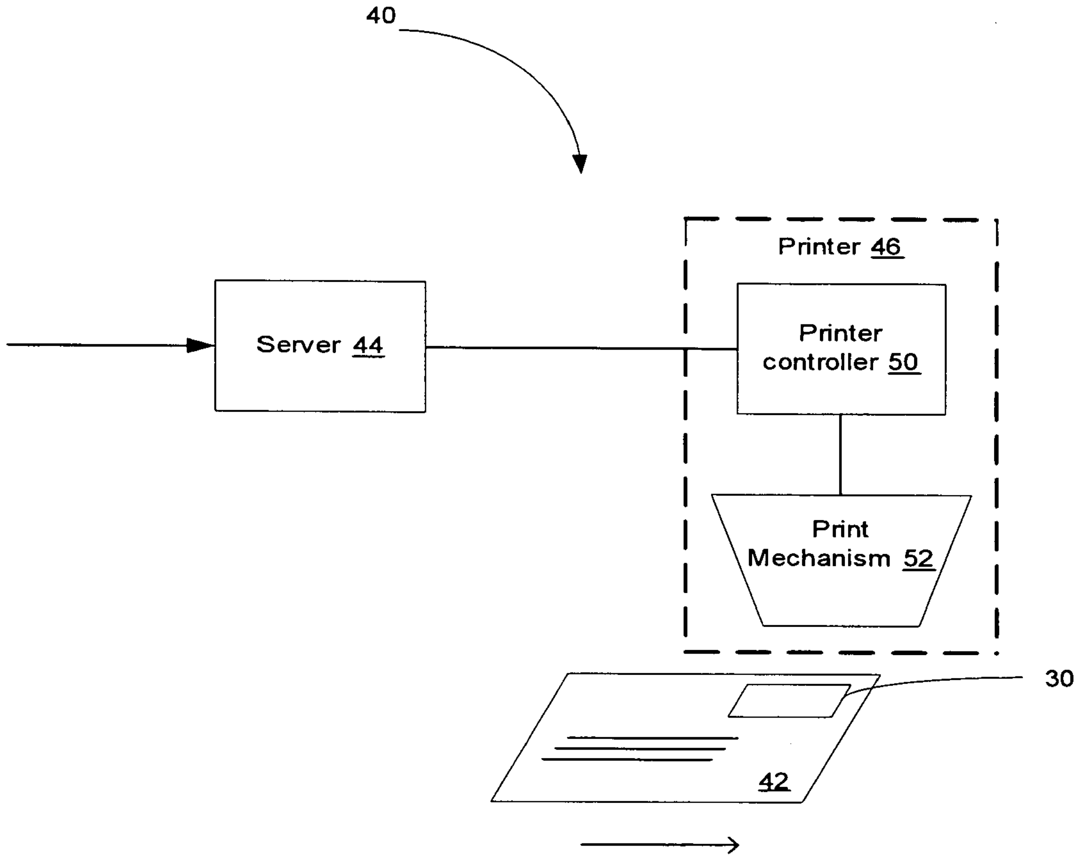
FIG. 3 shows a block diagram of a system for printing a postage meter indicium in accordance with the subject invention.

FIG. 3 shows printing system 40 for printing indicium 30 on mailpiece 42. Control of system 40 is provided by server 44 and printer controller 50 . . . Server 44 inputs postal information from a source such as a postal scale or data processing system and generates data describing a corresponding instance of indicium 30, which is then downloaded to printer 46. Printer controller 50 receives the data, typically in the form of a conventional printer control language, generates a digital representation of indicium 30 (e.g., a bitmap), and controls print mechanism 52 to print indicium 30 on mail piece 42 as it is transported through printer 46 by any convenient transport mechanism (not shown). Preferably, server 44 also carries out other postage meter functions such as secure accounting of postage expended. Such functions are well known to those skilled in the art and need not be described further here for an understanding of the subject invention.

As shown in FIG. 2, indicium 30 includes copy detection feature 32, which in turn includes at least fragile elements 32F. Where elements 32F are the commercially available Mediasec CDP seal, or a similar structure, elements 32F will be approximately 6 kilobytes in size, while the remainder of indicium 30 is only approximately 200 bytes in size (as described in the printer control language). Since typically communications between server 44 and printer 46 will be relatively low bandwidth, it is generally preferred that the elements 32F be generated by controller 50. In applications where only a few different types of elements 32F are used (e.g., where elements 32 F are linked only to a postage amount), or where a high bandwidth link is provided between server 44 and printer 46, it may be practical to generate elements 32F on server 44. More generally, system 40 can be implemented using any convenient control architecture and control functions of server 44 and controller 50 can be partitioned between one or more processors in any convenient manner.

Figure 4:
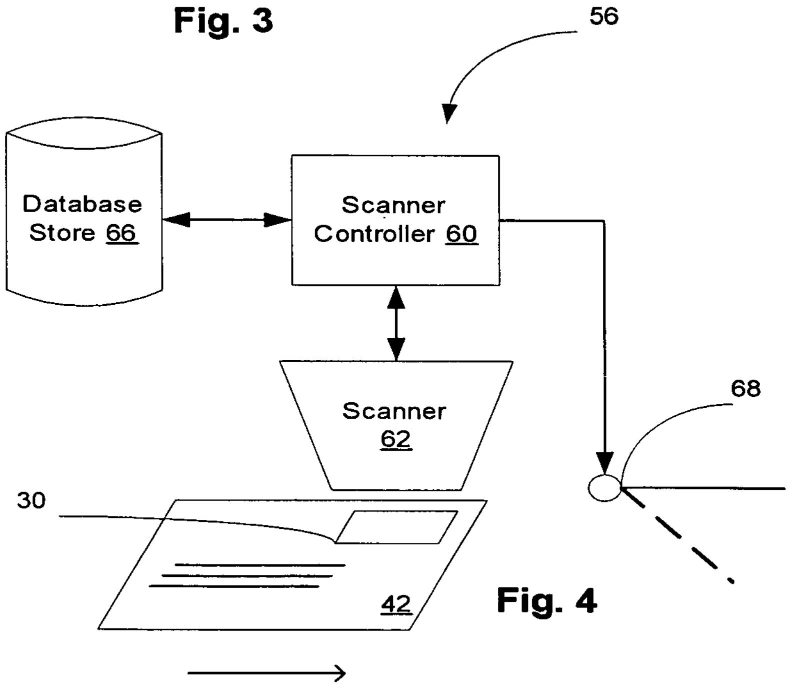
FIG. 4 shows block diagram of a system for determining if a postage meter indicium putatively printed in accordance with the subject invention is in fact unaltered.

FIG. 4 shows scanning system 56 for scanning indicium 30 on mailpiece 42. Scanner controller 60 controls scanner 62 to scan indicium 30 on mail piece 42 as it is transported through system 56 by any convenient transport mechanism (not shown) to recover digital images of barcode 34 and copy detection feature 32. Controller 60 also tests these images of barcode 34 and copy detection feature 32, as will be described further below with regard to various preferred embodiments of the subject invention, and indicates acceptance of mailpiece 42; typically by controlling gate 68, or other convenient mechanism, to pass mailpiece 42 on for further processing, or otherwise divert it for investigation. System 56 can also include database store 66 which stores a print-scan models for various printer types which can be used in various instances of system 66, or Copy Likelihood Indices (hereinafter "CLIs") for particular printers which are used in various instances of system 66. Controller 60 can also recover and output other postal information from mailpiece 42 and output such information to other apparatus or systems for use in other functions for processing accepted mailpieces or investigating mailpieces which are not accepted. Such functions are well known to those skilled in the art and need not be described further here for an understanding of the subject invention. More generally, system 56 can be implemented using any convenient control architecture and control functions of controller 60 can be partitioned between one or more processors in any convenient manner.

Figure 5:
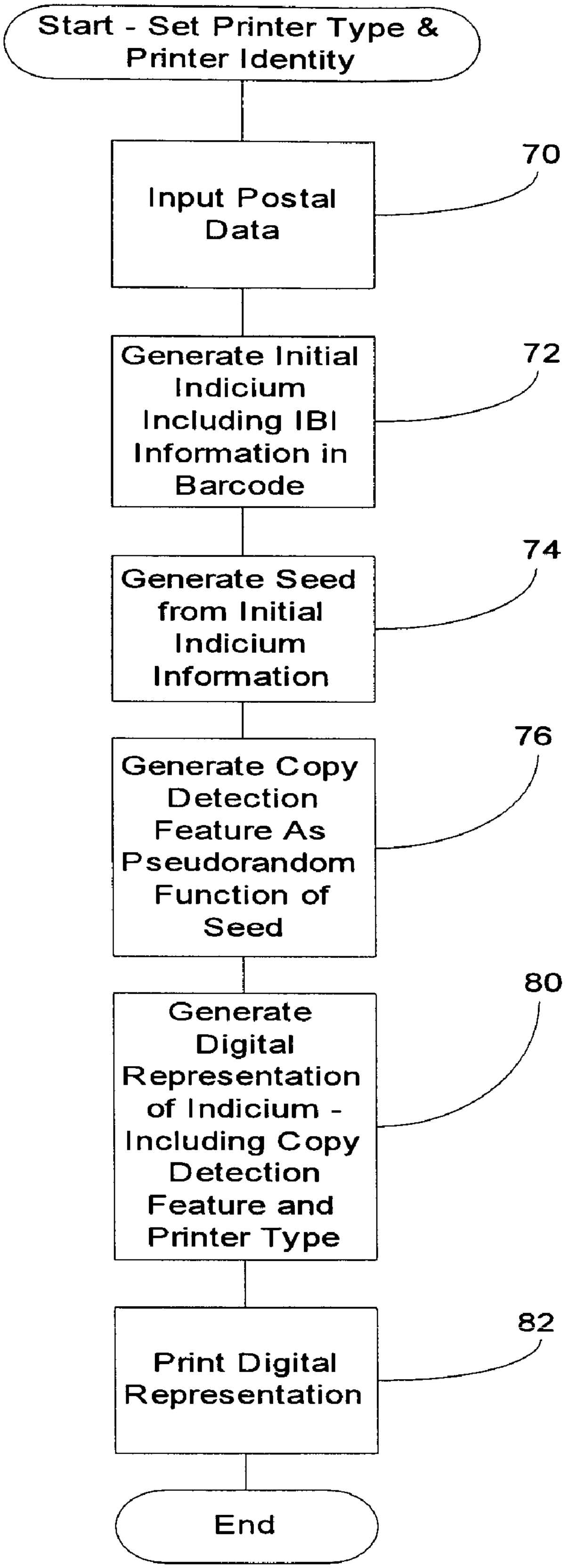
FIG. 5 shows a flow diagram of the operation of the system of FIG. 3 in accordance with an embodiment of the subject invention.

In a preferred embodiment of the subject invention system 40 is programmed as shown in FIG. 5 to print indicium 30. Initially the type of printer used in the particular embodiment of system 40 is identified. In another preferred embodiment the particular printer used is also identified. At step 70 postal information for mailpiece 42 is input to server 44 which generates an initial indicium in a conventional manner at step 72. Typically the initial indicium will be substantially similar to indicium 10 (shown in FIG. 1). Then at step 74 server 44 generates a seed from the initial indicium; preferably based upon IBI information included in the barcode. Then at step 76 a digital representation of copy detection feature 32 is generated as pseudorandom function of the seed. In the embodiment of FIG. 5 feature 32 includes only elements 32F. Preferably, as with the CDP seal, elements 32F are generated by varying the grey scale value (i.e. print density) of elements 32F in accordance with the output of a pseudorandom number generator which has been initialized with the seed.

The seed can be chosen to link feature 32 to the indicium with greater or lesser particularity. For example, the seed can be the postal denomination of the indicium so that typically many identical copy detection features are printed; or it can be all or a portion of the barcode signature, so that identical copy detection features are highly unlikely. The first case has the disadvantage that, if many identical copy detection features are printed, than it becomes easier to determine at least a satisfactory approximation of the digital form of the feature. The second case has the disadvantage that, if many different copy detection features are printed than it becomes easier to determine the algorithm used to generate the copy detection features. Once the algorithm is known a dishonest user can recover the seed from the barcode and print and paste it together with the barcode many times.

To overcome or reduce these problems, in a preferred embodiment of the subject invention the seed generated from the initial indicium is combined (e.g., by appending or by an exclusive or operation) with a secret key which is known to the postal service or system provider but secret to the user, and which is updated from time to time. The security of system 40 would then depend on the security of the key rather than secrecy of the algorithm; and, depending on how often the secret key is updated, the number of identical copy detection features will be reduced. It should be note that postage metering systems are designed to be inherently tamper proof, so that a user could not recover the key from system 40.

Then at step 80, a digital representation of indicium 30, preferably a bitmap, is generated combining the initial indicium, information identifying the printer type, and the digital representation of copy detection feature 32, and at step 82 the resulting digital representation is printed in a conventional manner by print mechanism 52. As noted above, the digital representation can be generated either by server 44 or by printer controller 50. In general, the partitioning of various functions among various processors of the system is a matter of systems design dependent upon available processing power and communications bandwidth and such details of systems design form no part of the subject invention except as may be set forth in the claims below.

Figure 6:
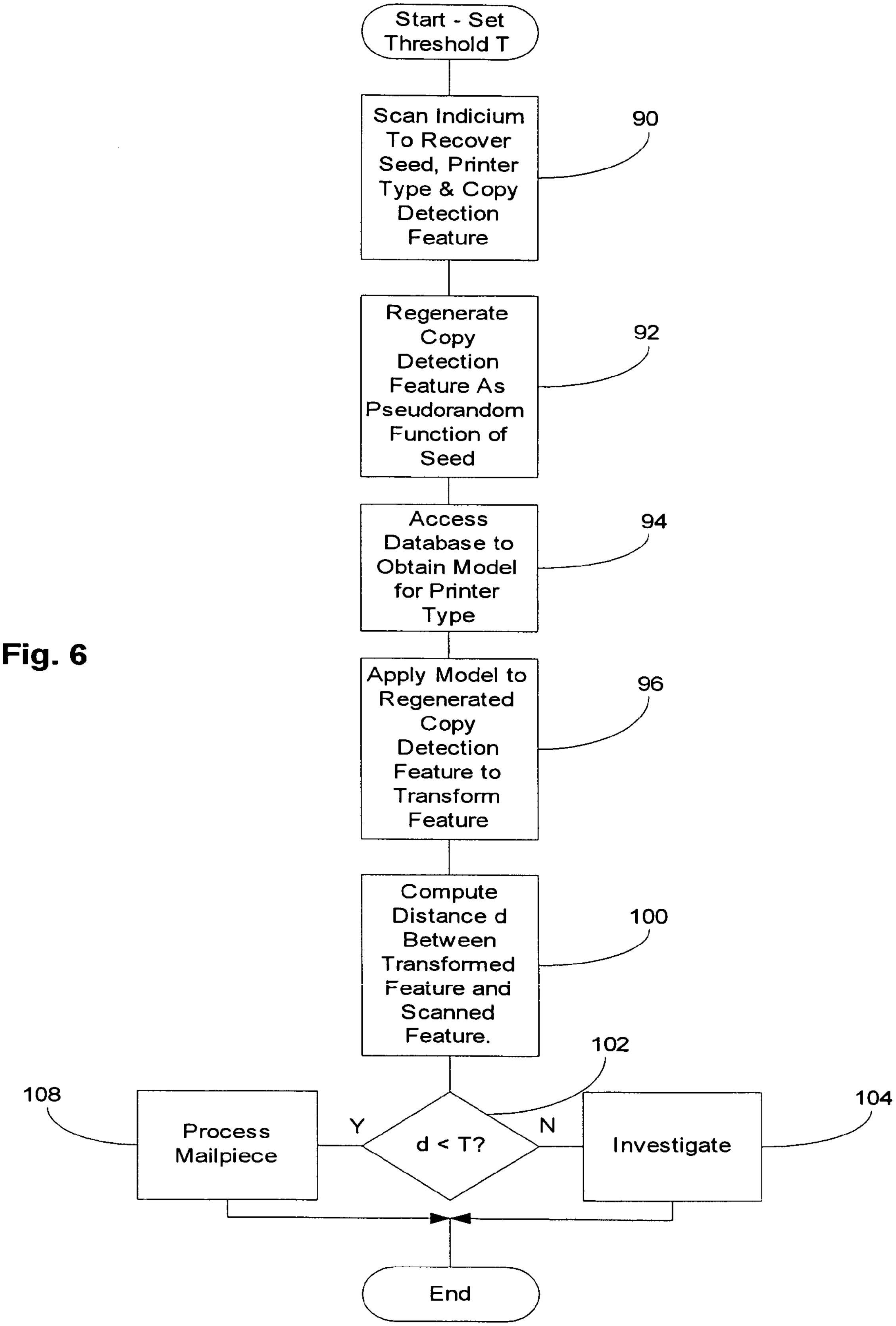
FIG. 6 shows a flow diagram of the operation of the system of FIG. 4 in accordance with an embodiment of the subject invention.

FIG. 6 shows the operation of system 56 programmed to determine if an indicium, which putatively includes copy detection feature 32 linked to barcode 34 by the method substantially as shown in FIG. 5, is unaltered. Initially threshold T is set. At step 90 scanner controller 60 controls scanner 62 to scan indicium 30 to recover the seed, printer type, and a scanned digital image of copy detection feature 32 from indicium 30. Then at step 92 controller 60 regenerates a second digital representation of copy detection feature 32 from the recovered seed, using the same pseudorandom function discussed with respect to FIG. 5. In a preferred embodiment the seed is combined with a secret key, as also discussed above.

Then at step 94 controller 60 accesses database store 66 to obtain a model for the identified printer type; and at step 96 applies that model to the regenerated representation of copy detection feature 32 to transform the regenerated representation to more closely approximate the scanned image of copy detection feature 32.

In general the development of computational models which transform a digital representation to approximate an image recovered by scanning a printed representation of the digital representation (when printed using a particular printer type and scanner type) is well within the ability of those skilled in the art. A preferred method is disclosed in the above referenced copending application Ser. No. 10/720,503, which is hereby incorporated by reference. As described therein, data for particular printing and scanning equipment may be generated according to the following procedure. First, image data may be generated that corresponds to a strip of gray scale blocks, each block corresponding to a respective gray scale level, and the strip as a whole representing a sequence of gray scale levels that spans the interval from white to black. A printed image is then produced on the basis of the image data and using the particular printer. The printed image is then scanned with the corresponding particular scanner, and the pixel values corresponding to each gray scale block of the printed image are correlated with the gray scale values in original gray scale image data. With suitable interpolation, if appropriate, the correlation of the gray scale levels in the scanned image data with the gray scale levels in the original image data may be used to generate a transform, or print-scan model, mapping a digital representation into an approximation of the image recovered after printing and scanning for the particular printer type and scanner type. As used herein the term "print-scan model" refers to a transform which maps all, or any portion, of a print-scan channel. In other embodiments of the subject invention, other models of the print-scan channel can be used. For example, the print-scan channel may be modeled as a linear spatial filter, or as a non-linear spatial filter. Development of such filters is well within the ability of those skilled in the art and need not be discussed further here for an understanding of the subject invention.

At step 100 distance d between recovered copy detection feature 32 and the transformed copy detection feature obtained at step 96 is measured. The form that such measurement takes is determined by the form of copy detection feature 32.

Generally distance is a function d(A,B) taking to inputs A and B (the two things we want to measure the distance between, here the recovered copy detection feature and the transformed copy detection feature) and outputs a non-negative real number: $d(A,B)\geqq 0$ The function has two additional properties:

$$\text{for all } A\text{: } d(A,A)=0$$

$$\text{for all } A,B,C\text{: } d(A,C)+d(C,B)\geqq d(A,B)$$

$$\text{(implying that for all } A,B\text{: } d(A,B)=d(B,A)\text{)}$$

One useful type of distance function is a Hamming distance. A simple Hamming distance takes as input 2 strings, or vectors, of the same length, of characters and outputs the number of positions where the character in one string does not coincide with the character in the other. nn image array is easily transformed into a string by concatenating rows or columns, or in any other convenient, predetermined manner.) For instance d(0011010, 0111001)=3, because there are 3 positions where characters do not coincide.

Another common Hamming type distance is the Euclidean distance between n-dimensional vectors: V=(v1,v2, . . . ,vn), U=(u1,u2, . . . ,un) given by:

$$d(U,V)=(\Sigma^{n}_{i=1}(u_i-v_i)^2)^{1/2}$$

A similar distance is:

$$d(U,V)=\Sigma^{n}_{i=1}|u_i-v_i|\text{; where } |X| \text{ is the absolute value of } X.$$

To compute the distance between 2 images it is known to transform first the images from an array (with grey levels as entries) to a vector and compute a distance d as described immediately above. However, while such distances are simple to use they can be sensitive to shift. That is, if B is equal, or nearly equal, to image A shifted by one or two pixels in any direction, then d(A,B) might be larger than what we would like (wrongly indicating that A and B are dissimilar when they are actually very similar but misregistered); particularly if A is a pseudorandom image such as CDP seal. In such cases a well known type of distance using correlation coefficients, which is less sensitive to shift, can usefully be used.

Such methods for comparing images by measuring a distance are well known to those skilled in the art and it is well within their ability to select an appropriate distance function for a given copy detection feature in accordance with the above principles. Preferably, when relatively simple inputs, such as robust descriptors, which are coded with a limited alphabet and which are expected to be much shorter than the whole image they describe, a Hamming type distance can be used; while when images such as copy detection features are directly compared a conventional, vectorial based distance using correlation coefficients can be used effectively. Particularly, the Mediasec CDP seal preferably is used with known software for measuring distances which is commercially available from Mediasec. Alternatively, where Hamming type differences are used, the images can be shifted slightly a number of times in varying directions and multiple distances computed after each shift and the minimum distance found selected as representative of the closest registration.

At step 102 distance d is compared to threshold T and, if d is not less that T, at step 104 diverts mailpiece 42 for investigation. Otherwise, at step 108 system 56 indicates that indicium 30 has not been altered and mailpiece 42 is passed on for further processing in a conventional manner.

Figure 7:
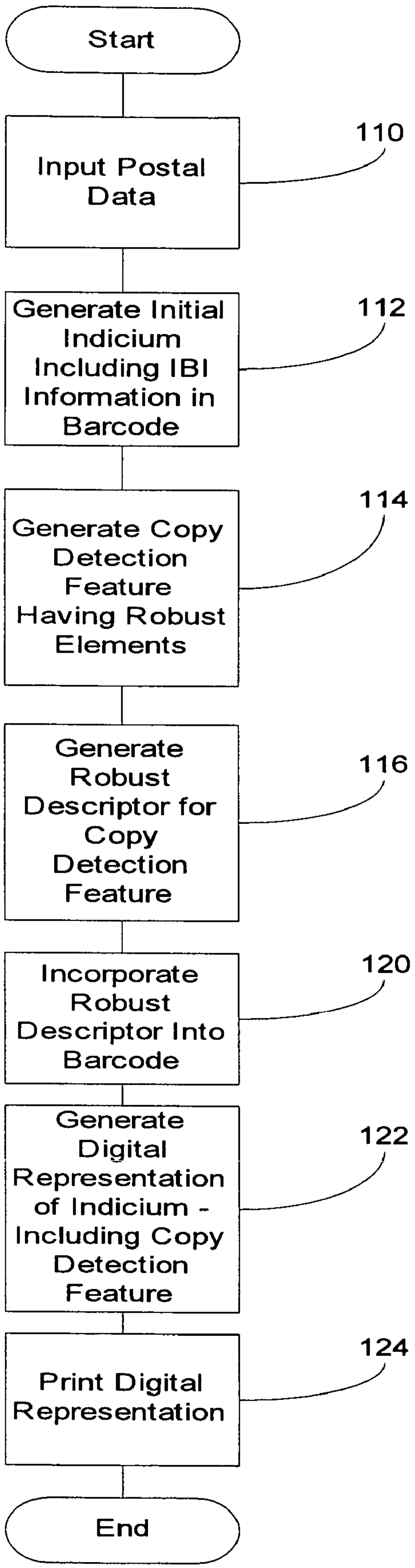
FIG. 7 shows a flow diagram of the operation of the system of FIG. 3 in accordance with another embodiment of the subject invention.

In another preferred embodiment of the subject invention system 40 is programmed as shown in FIG. 7 to print indicium 30. At step 110 postal information for mailpiece 42 is input to server 44 which generates an initial indicium in a conventional manner at step 112. Typically the initial indicium will be substantially similar to indicium 10 (shown in FIG. 1). Then at step 114 server 44 generates copy detection feature 32, including robust elements 32R, using any convenient pseudorandom function. (In this embodiment of the subject invention elements 32F are relied upon only for protection against copying of the whole of indicium 30.) Then at step 114 server 44 generates a robust descriptor of features 32R. For example, where features 32R are statistical parameters of features 32F, the robust descriptor can be the mean or variance of grey scale values sample along one or more predetermined paths through elements 32F; or elements 32R can be a simple linear barcode, or the like, which directly expresses the robust descriptor. Numerous other examples of robust elements and associated descriptors will be readily apparent to those skilled in the art. At step 116 the robust descriptors are incorporated into barcode 34.

Then at step 120 a digital representation of indicium 30, preferably a bitmap, is generated combining the initial indicium, information identifying the printer type, and the digital representation of copy detection feature 32, and at step 122 the resulting digital representation is printed in a conventional manner by print mechanism 52.

Figure 8:
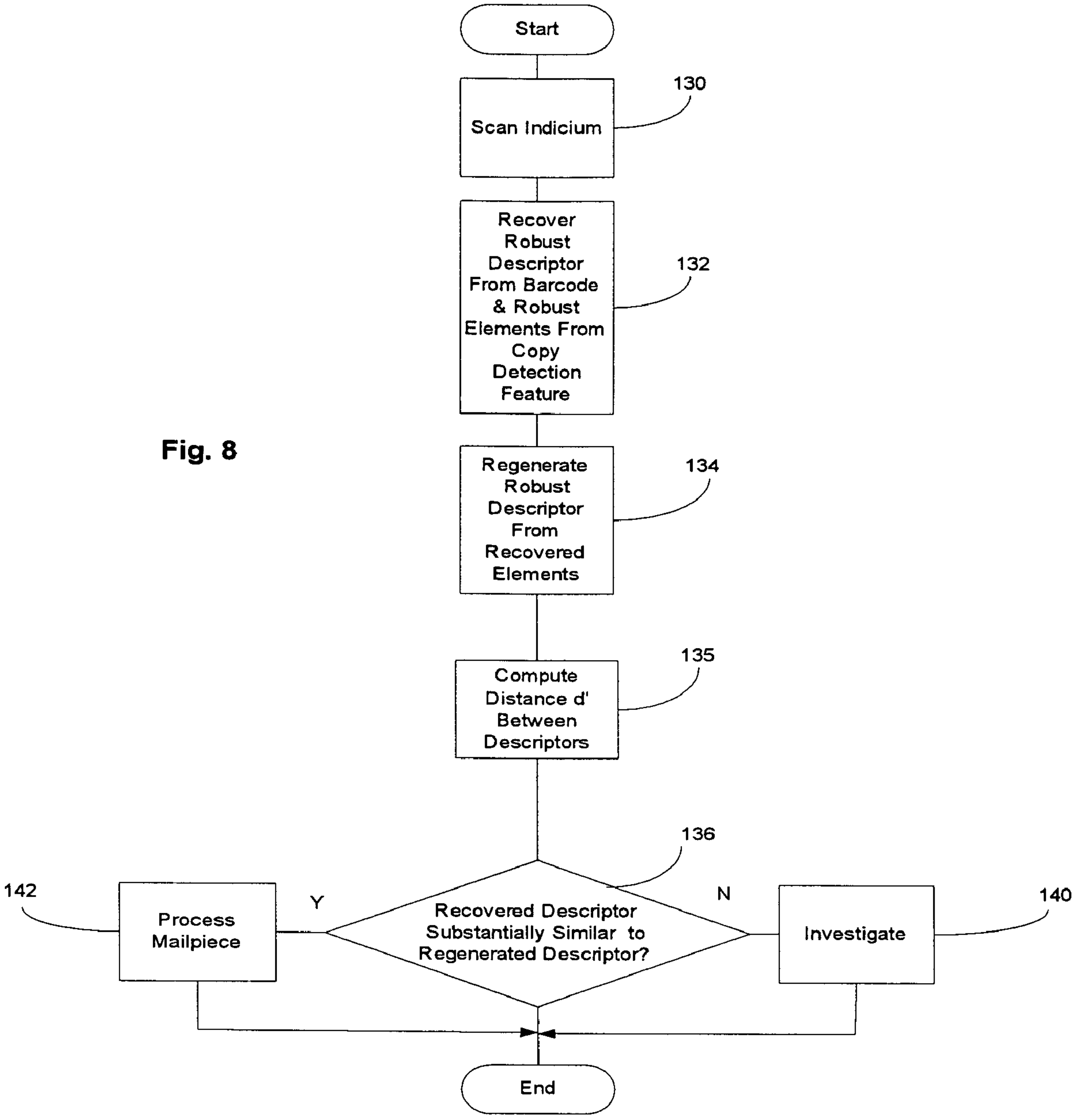
FIG. 8 shows a flow diagram of the operation of the system of FIG. 4 in accordance with another embodiment of the subject invention.

FIG. 8 shows the operation of system 56 programmed to determine if an indicium, which putatively includes copy detection feature 32 linked to barcode 34 by the method substantially as shown in FIG. 7, is unaltered. At step 130 scanner, controller 60 controls scanner 62 to scan indicium 30 to recover images of copy detection feature 32 and barcode 34. Then at step 132 controller 60 recovers the robust descriptor from the image of barcode 34 and robust elements 32R from the image of copy detection feature 32. Then at step 134 controller 60 regenerates the robust descriptor from the image of elements 32R.

At step 135 a distance d', which is preferably a Hamming type distance, as described above, between the regenerated and recovered descriptors is computed. At step 136 the regenerated robust descriptor is compared to the recovered descriptor and, if they are not at least substantially similar (i.e., if the distance is not less than a predetermined threshold), at step 140 diverts mailpiece 42 for investigation. Otherwise, at step 142 system 56 indicates that indicium 30 has not been altered and mailpiece 42 is passed on for further processing in a conventional manner.

Figure 9:
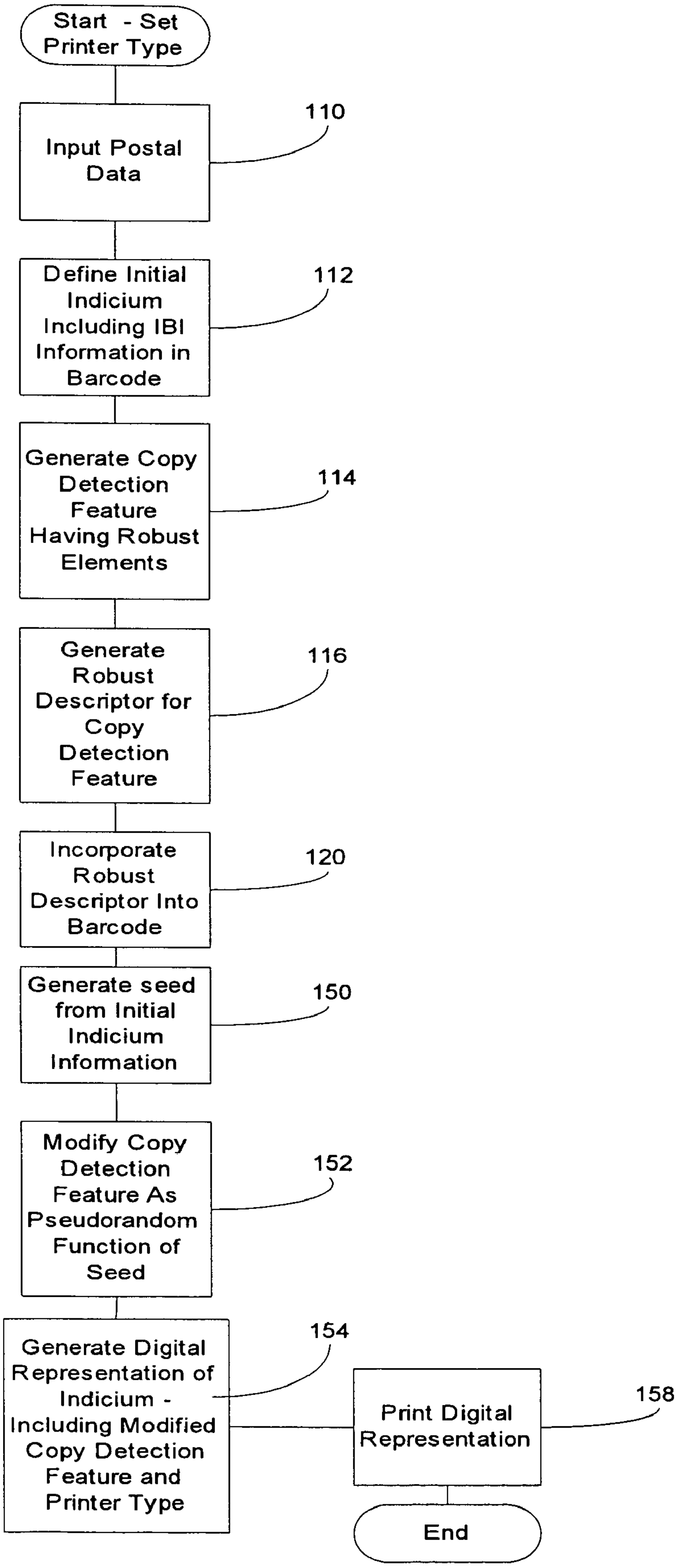
FIG. 9 shows a flow diagram of the operation of the system of FIG. 3 in accordance with another embodiment of the subject invention.

In another preferred embodiment of the subject invention system 40 is programmed as shown in FIG. 9 to print indicium 30. Initially the type of printer used in the particular embodiment of system 40 is identified. Then steps 110 through 120 are carried out substantially as described above with respect to FIG. 7. Then at step 150, server 44 generates a seed from the initial indicium; preferably based upon IBI information included in the barcode.

At step 152 server 44 modifies copy detection feature 32; preferably by watermarking robust elements 32R. Then at step 154, a digital representation of indicium 30, preferably a bitmap, is generated combining the initial indicium and the digital representation of modified copy detection feature 32, and at step 158 the resulting digital representation is printed in a conventional manner by print mechanism 52.

Figure 10:
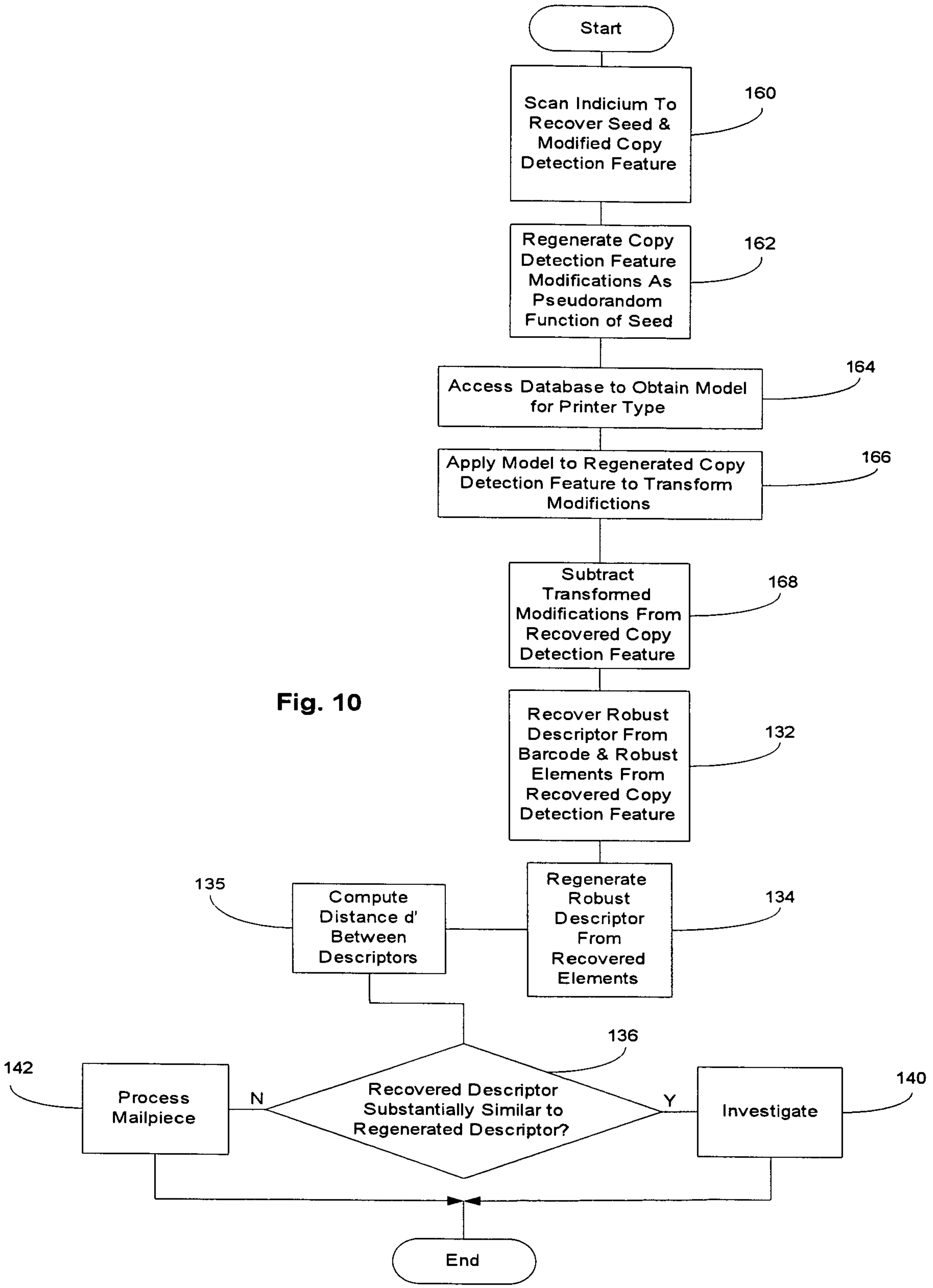
FIG. 10 shows a flow diagram of the operation of the system of FIG. 4 in accordance with another embodiment of the subject invention.

FIG. 10 shows the operation of system 56 programmed to determine if an indicium, which putatively includes copy detection feature 32 linked to barcode 34 by the method substantially as shown in FIG. 9, is unaltered. At step 160, scanner controller 60 controls scanner 62 to scan indicium 30 to recover the seed and a scanned digital image of modified copy detection feature 32 from indicium 30. Then at step 162, controller 60 regenerates a second digital representation of the modifications to copy detection feature 32 from the recovered seed, using the same pseudorandom function discussed with respect to FIG. 9. In a preferred embodiment the seed is combined with a secret key, as also discussed above.

Preferably, at step 164 controller 60 accesses database store 66 to obtain a model for the identified printer type; and at step 166 applies that model to the regenerated representation of copy detection feature 32 to transform the regenerated representation to more closely approximate the scanned image of the modifications.

Then, at step 168, controller 60 subtracts the regenerated modifications from the scanned image of modified copy detection feature 32 so that the regenerated image of feature 32 is restored to be substantially equivalent to the digital representation originally printed. Then at steps 132 through 142 the robust descriptor is recovered from barcode 34 and indicium 30 is tested substantially as described above with respect to FIG. 8.

Figure 11:
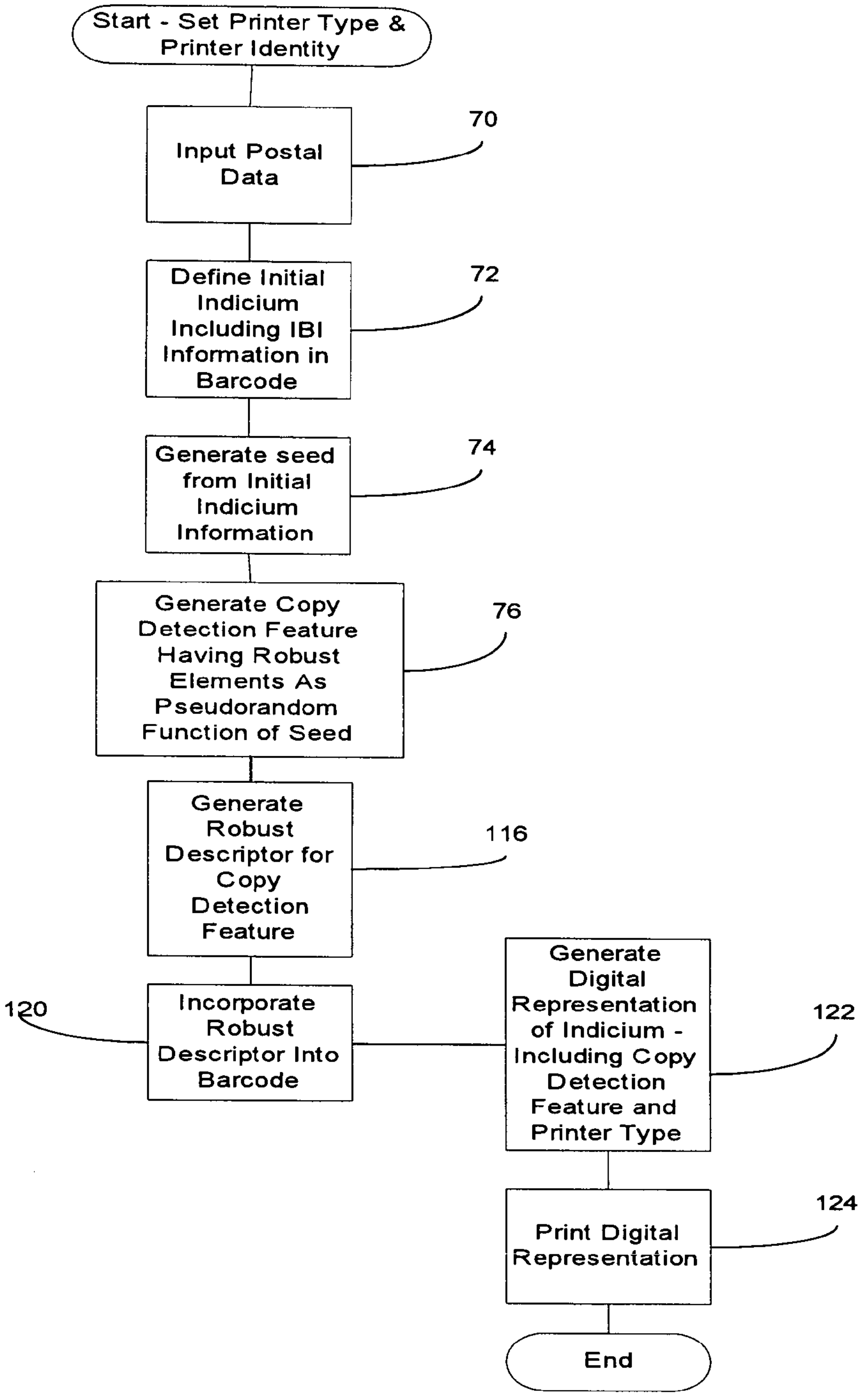
FIG. 11 shows a flow diagram of the operation of the system of FIG. 3 in accordance with another embodiment of the subject invention.

In a preferred embodiment of the subject invention system 40 is programmed to print indicium 30 as shown in FIG. 11. Initially the printer type used is identified. Steps 70 through 76 are carried out substantially as described above with respect to FIG. 5 to generate copy detection feature 32; with the provision that copy detection feature 32 will necessarily include robust elements 32R. Then, in steps 116 through 124, a robust descriptor is generated and incorporated into barcode 34, and barcode 30 is printed, substantially as described above with respect FIG. 7.

Figure 12:
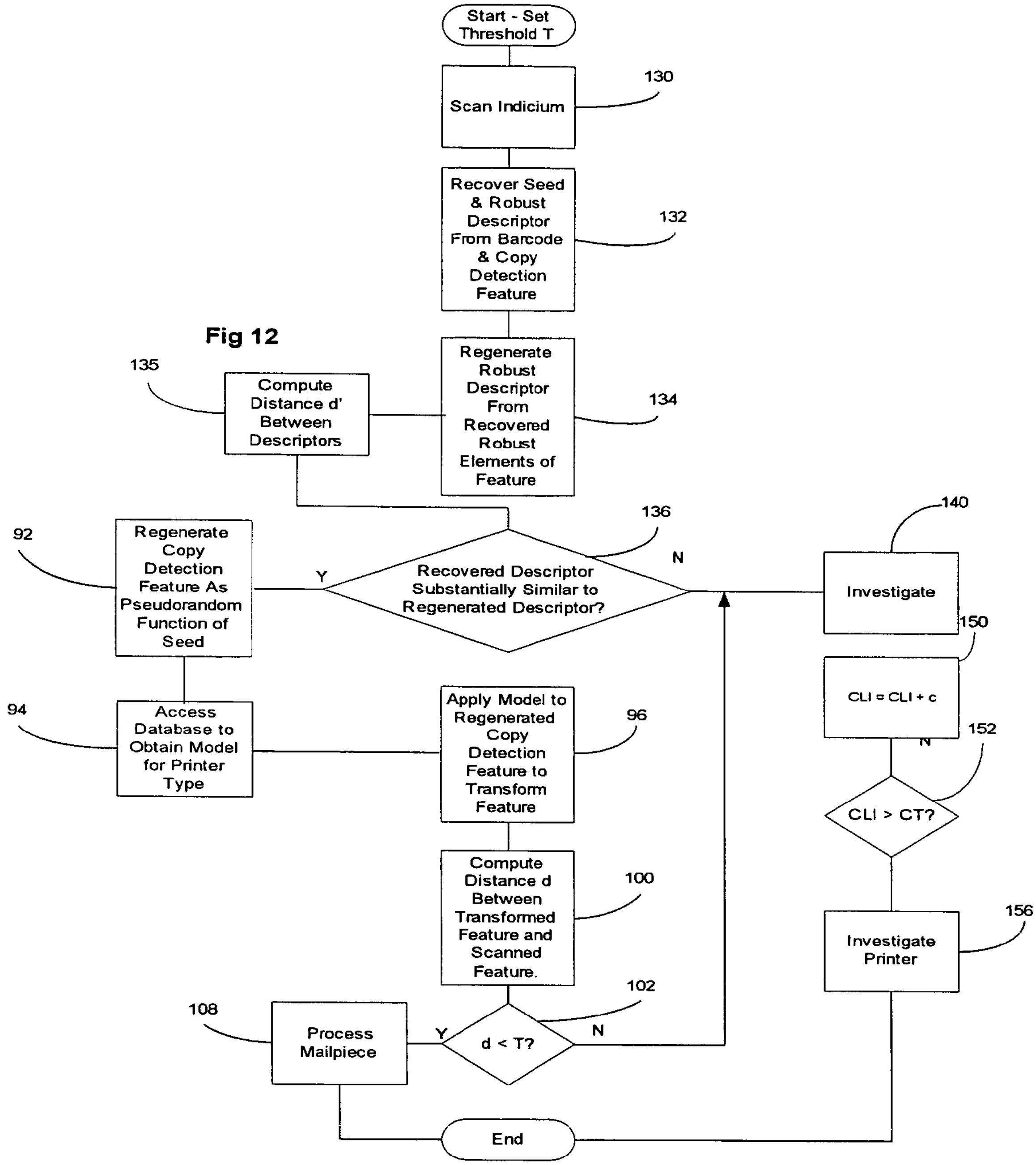
FIG. 12 shows a flow diagram of the operation of the system of FIG. 4 in accordance with another embodiment of the subject invention.

FIG. 12 shows the operation of system 56 programmed to determine if an indicium, which putatively includes copy detection feature 32 linked to barcode 34 by the method substantially as shown in FIG. 11, is unaltered. At step 130, scanner controller 60 controls scanner 62 to scan indicium 30 to recover the seed and a scanned digital image of modified copy detection feature 32 from indicium 30. Then at steps 132 through 136 controller 60 recovers and tests the robust descriptor; and, if the recovered descriptor is not at least substantially similar to a regenerated descriptor, diverts mailpiece 42 for investigation at step 140, substantially as described above with respect to FIG. 8; with the provision that a seed is also recovered at step 132.

Otherwise, if at step the test at step 136 determines that the descriptors are at least substantially similar, then at steps 92 through 102 controller 60 regenerates copy detection feature 32 from the recovered seed, transforms the recovered feature, and compares the regenerated copy detection feature to the scanned image of feature 32 and if distance d is less than threshold T processes mailpiece 42 at step 102 substantially as described above with respect FIG. 6; and otherwise diverts mailpiece 42 for investigation at step 140.

In another preferred embodiment, the particular printer used is evaluated for possible fraud or malfunction at steps 150 through 156, substantially as described below with respect to FIG. 13.

Figure 13:
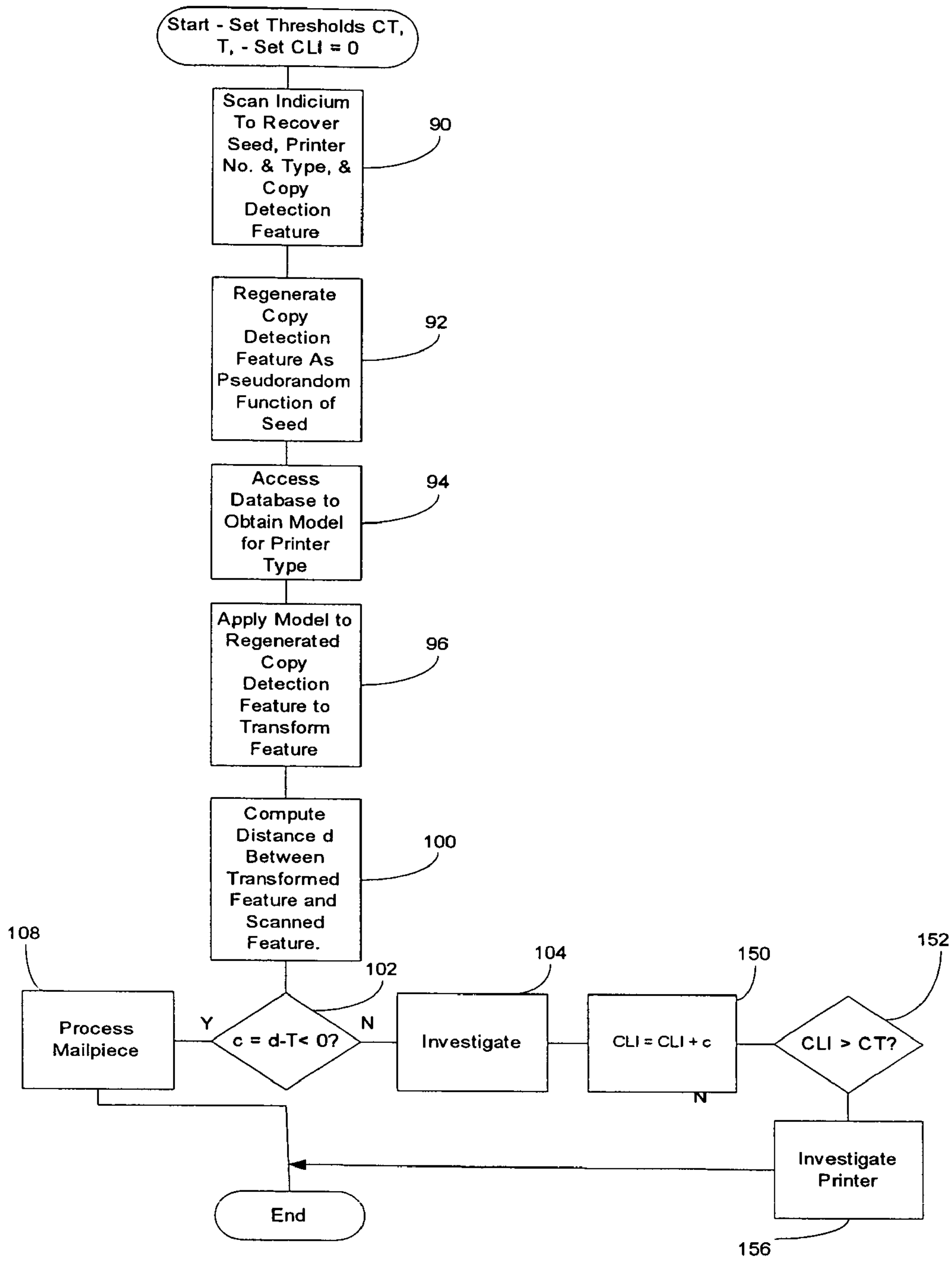
FIG. 13 shows a flow diagram of the operation of the system of FIG. 4 in accordance with yet another embodiment of the subject invention.

FIG. 13 shows the operation of system 56 programmed to determine if an indicium, which putatively includes copy detection feature 32 linked to barcode 34 by the method shown in FIG. 5, is unaltered. Initially thresholds T and CT are set and index CLI is set to 0. Then steps 90 through 108 are carried out to determine if difference c=d−T<0, and, if so, process mailpiece 42; all substantially as described above with respect FIG. 6. If c>0 then, after investigation of mailpiece 42, at step 150 CLI is set equal to CLI+c and at step 152 CLI is tested to determine if CLI>CT. If so, at step 156 the associated printer is investigated or possible malfunction or user fraud.

In other embodiments of the subject invention, steps 94 and 96 can be omitted from the methods shown in FIGS. 12 and 13, so that distance d is determined from the regenerated copy detection feature without transformation of the regenerated feature and omitted from the embodiment of FIG. 10, so that the modifications are not transformed after regeneration.

The embodiments described above and illustrated in the attached drawings have been given by way of example and illustration only. From the teachings of the present application those skilled in the art will readily recognize numerous other embodiments in accordance with the subject invention. Accordingly, limitations on the subject invention are to be found only in the claims set forth below.

What is claimed is:

1. A method for determining if a printed image is unaltered by determining if said image includes coded information and a copy detection feature linked to said coded information, said method comprising the steps of:

a) scanning said image to recover said coded information and said copy detection feature;

b) testing said coded information and said copy detection feature; where said copy detection feature includes robust elements and is determined to be unaltered if copy detection feature is determined to have been linked to said coded information by the steps of: generating said copy detection feature as a pseudorandom function of said coded information; creating a robust descriptor of said copy detection feature; and incorporating said descriptor into said coded information, and said testing step comprises the substeps of:

a) regenerating said robust descriptor from said recovered copy detection feature;

b) recovering said robust descriptor from said coded information;

c) comparing said recovered and said regenerated robust descriptors; and d) if said descriptors are at least substantially similar; then, e) regenerating said copy detection feature as a pseudorandom function of said coded information;

f) computing a distance between said recovered copy detection feature and said regenerated copy detection feature; and g) indicating that said link exists if said distance is less than a predetermined threshold; and h) accepting said printed image as unaltered if said testing step indicates that said coded information and said copy detection feature are linked.

2. A method as described in claim 1 where said descriptors are compared by computing a distance between said descriptors and determining that said descriptors are substantially similar if said distance is less than a predetermined threshold.

3. A method as described in claim 1, where said image includes information identifying a particular printer used to print said image, comprising the additional steps of:

a) if said distance is greater than said threshold, adding a difference between said distance and said threshold to a copy likelihood index associated with said particular printer; and b) indicating a possible problem with said particular printer if said copy likelihood index is greater than a second predetermined threshold.

4. A method as described in claim 1, where said image includes information identifying a printer type used to print said image, comprising the additional steps of:

a) recovering said printer type information; and b) applying a print-scan model corresponding to said printer type information to said regenerated copy detection feature and said regenerated robust descriptors to transform said regenerated feature and descriptors so as to more closely approximate a scanned image.

* * * * *